United States Patent [19]

Ohnishi et al.

[11] Patent Number: 5,357,011
[45] Date of Patent: Oct. 18, 1994

[54] PROCESS FOR PRODUCING VINYL CHLORIDE-BASED POLYMERS

[75] Inventors: Shuji Ohnishi, Lake Jackson, Tex.; Tadashi Amano, Kamisu, Japan

[73] Assignee: Shin-Etsu Chemical Co., Ltd., Tokyo, Japan

[21] Appl. No.: 159,248

[22] Filed: Nov. 30, 1993

[30] Foreign Application Priority Data

Dec. 1, 1992 [JP] Japan ................................ 4-349883

[51] Int. Cl.$^5$ .............................................. C08F 4/38
[52] U.S. Cl. ................................................. 526/228
[58] Field of Search ...................................... 526/228

[56] References Cited

U.S. PATENT DOCUMENTS 4,914,169  4/1990  Suyama et al. ...................... 526/228

FOREIGN PATENT DOCUMENTS

| | | | |
|---|---|---|---|
| 57-44604 | 3/1982 | Japan | 526/228 |
| 3207706 | 9/1991 | Japan | 526/228 |
| 551404 | 3/1993 | Japan | 526/228 |

Primary Examiner—Joseph L. Schofer
Assistant Examiner—N. Sarofim
Attorney, Agent, or Firm—Oblon, Spivak, McClelland, Maier & Neustadt

[57] ABSTRACT

A process for producing a vinyl chloride-based polymer, which comprises suspension polymerizing vinyl chloride monomer or a vinyl chloride-containing monomeric mixture in an aqueous medium in the presence of an oil-soluble polymerization initiator, wherein the initiator comprises (A) at least one compound having a 10-hour half-life temperature, at a concentration of 0.1 mol/l in benzene, of not lower than 35° C., and (B) at least one compound having a 10-hour half-life temperature, at a concentration of 0.1 mol/l in benzene, of lower than 35° C., with the amount of the initiator (B) being from 0.01 to 0.07% by weight based on the monomer or monomeric mixture and being from 10 to 30% by weight based on the total amount of the initiators (A) and (B). The process makes it possible to shorten easily the time required for raising temperature, and to produce vinyl chloride-based polymers which have a good particle size distribution and which have few fish eyes when formed into sheets or the like.

6 Claims, No Drawings

PROCESS FOR PRODUCING VINYL CHLORIDE-BASED POLYMERS

BACKGROUND OF THE INVENTION

1. Field of the Invention

The present invention relates to a process for producing vinyl chloride-based polymers, and particularly to a process for producing vinyl chloride-based polymers by which vinyl chloride-based polymers of high quality can be produced with high productivity.

2. Description of the Prior Art

In general, suspension polymerization of vinyl chloride or a vinyl chloride-containing monomeric mixture (hereinafter referred to as "vinyl chloride or the like") is carried out, for example, by a process as follows. First, a polymerization vessel equipped with a jacket and a reflux condenser is charged with an aqueous medium, a dispersing agent (suspending agent) and a polymerization initiator. Then, after evacuation of the polymerization vessel, the monomer is charged into the vessel, optionally with other various additives as required. Thereafter, hot water is let flow through the jacket for heating until a predetermined reaction temperature is reached in the vessel. Subsequently, cooling water is let flow through the jacket to remove the heat of polymerization reaction, thereby maintaining the predetermined reaction temperature in the vessel while the polymerization reaction is conducted.

In recent years, for attaining higher productivity, attempts have been made to shorten the time required for each batch of polymerization. For shortening the polymerization time per batch, decreases should be made in the time required for raising temperature, as well as in the time necessary for charging materials into the polymerization vessel, the reaction time, etc.

As a method of shortening the temperature-raising time, there have been known, for example, (1) a method wherein an aqueous medium with a suspending agent dissolved therein which has been preliminarily heated to a predetermined temperature and a monomer with a polymerization initiator dissolved therein which has been preliminarily heated to a predetermined temperature are simultaneously charged into a polymerization vessel (Japanese Patent Publication (KOKOKU) No. 60-26488 (1985)); (2) a method wherein a monomer and a polymerization initiator are charged into a polymerization vessel and mixed uniformly with each other, and then water which has been heated to a temperature of 50° to 80° C. and deaerated is charged into the vessel (Japanese Patent Publication (KOKOKU) No. 1-50243 (1989)); and (3) a method wherein at least 70% by weight of a monomer to be charged and at least 70% by weight of preliminarily heated water to be charged are simultaneously charged into a polymerization vessel and wherein a suspending agent and a polymerization initiator are charged into the vessel at controlled timings (Japanese Pre-examination Patent Publication (KOKAI) No. 1-172407 (1989)). These methods are not only effective for the purpose intended but are excellent in view of compensating for the deficiency of heating capability of the polymerization vessel, which deficiency arises from increases in vessel size and the use of reflux condensers.

However, although the above-mentioned methods are extremely efficient in shortening the temperature-raising time, they involve complicated operations for charging the necessary materials into the polymerization vessel. In addition, the methods necessitate mixers for preparing the liquid materials to be charged (for example, the aqueous medium with a suspending agent dissolved therein which is preliminarily heated to a predetermined temperature, as described in (1) above) and equipment for heating.

Furthermore, the above method have the disadvantage that the polymeric product obtained includes many coarse grains, and has an increased number of fish eyes when formed into a sheet or the like. This is probably because the inside of the polymerization vessel is heated to a high temperature before the monomer charged into the vessel becomes suspended as oil droplets uniformly and stably in the aqueous medium, and, as a result, polymerization reaction is initiated and proceeds too rapidly.

SUMMARY OF THE INVENTION

It is accordingly an object of the present invention to provide a process for producing vinyl chloride-based polymers that makes it possible to shorten easily the time necessary for raising temperature and to produce high-quality polymers which are in the form of particles including few coarse particles and which have few fish eyes when processed into formed products such as sheets.

In order to attain the above object, the present invention provides a process for producing a vinyl chloride-based polymer, which comprises suspension polymerizing vinyl chloride monomer or a vinyl chloride-containing monomeric mixture in an aqueous medium in the presence of an oil-soluble polymerization initiator, wherein the oil-soluble polymerization initiator comprises (A) at least one compound having a 10-hour half-life temperature, at a concentration of 0.1 mol/l in benzene, of not lower than 35° C., and (B) at least one compound having a 10-hour half-life temperature, at a concentration of 0.1 mol/l in benzene, of lower than 35° C., the oil-soluble initiator (B) being present in an amount ranging from 0.01 to 0.07% by weight based on the amount of the monomer or monomeric mixture and ranging from 10 to 30% by weight based on the total amount of the oil-soluble initiators (A) and (B).

According to the process of the present invention, the oil-soluble polymerization initiators (A) and (B) as described above are used together, whereby the temperature-raising time can be easily shortened.

Also, according to the process of the present invention, it is possible to produce vinyl chloride-based polymers which have a good particle size distribution and which have few fish eyes when formed into sheets or the like.

DETAILED DESCRIPTION OF PREFERRED EMBODIMENTS

The oil-soluble polymerization initiator (A) has a 10-hour half-life temperature at a concentration of 0.1 mol/l in benzene (hereinafter represented by the symbol "$t_{\frac{1}{2}}(10hr)$") of not lower than 35° C., preferably from 40 to 60° C. Such polymerization initiator may be any of those conventionally used for polymerization of vinyl chloride or the like, and includes, for example, peroxycarbonate compounds such as diisopropyl peroxydicarbonate ($t_{\frac{1}{2}}(10hr)$: 40.5° C.,), bis(2-ethylhexyl) peroxydicarbonate (43.5° C.), bis(ethoxyethyl) peroxydicarbonate (43.4° C.) and the like; peroxyester compounds such as t-hexyl peroxypivalate (53.2° C.), α-cumyl peroxyneodecanoate (36.6° C.), t-butyl peroxyneodecanoate (46.5° C.), t-hexyl peroxyneodecanoate (44.7° C.) and the like; peroxyacetate compounds such as 2,4,4-trimethylpentyl-2-peroxyphenoxyacetate (36.0° C.), and so forth.

The oil-soluble polymerization initiator (B) has a $t_{\frac{1}{2}}$(10hr) of lower than 35° C., preferably from 25° to 34° C., and is highly active at low temperatures. Such polymerization initiators include, for example, isobutyryl peroxide ($t_{\frac{1}{2}}$(10hr): 32.5° C.), acetylcyclohexylsulfonyl peroxide (26.5° C.), and the like.

The oil-soluble polymerization initiator (B) has high activity at low temperatures as above described, and decomposes at low temperatures. Therefore, after heating of the reaction mixture in a polymerization vessel is started, decomposition of the initiator (B) proceeds as the temperature of the reaction mixture is raised. Attendant on the decomposition of the initiator (B), heat of polymerization reaction is generated to accelerate the rise in the temperature. Accordingly, the temperature of the reaction mixture can be raised to a desired level in a shorter time. The amount of the oil-soluble polymerization initiator (B) to be placed in the polymerization vessel is from 0.01 to 0.07% by weight, preferably from 0.01 to 0.04% by weight, based on the amount of monomer charged into the vessel, and is from 10 to 30% by weight based on the total amount of the oil-soluble polymerization initiators (A) and (B). Where the amount of the initiator (B) is less than 0.01% by weight based on the amount of monomer and/or less than 10% by weight based on the total amount of the initiators (A) and (B), the effect of shortening the temperature-raising time is slight. On the other hand, where the amount of the initiator (B) is more than 0.07% by weight based on the amount of monomer and/or more than 30% by weight based on the total amount of the initiators (A) and (B), the generation of heat occurs concentratedly centratedly at or around the end of the temperature-raising operation. In such a case, the heat removal capacity of the polymerization vessel may be insufficient for maintaining the reaction mixture at a predetermined temperature without difficulty, and the reaction can get out of control; in addition, there arises the problem that the resulting polymeric product will have an increased number of fish eyes when formed into sheets or the like.

The monomers which can be polymerized by applying the process of the present invention include not only vinyl chloride as sole monomer but also monomeric mixtures which contain vinyl chloride as a main component (normally, the amount of vinyl chloride in the monomeric mixtures is at least 50% by weight). The comonomers to be copolymerized with vinyl chloride include, for example, vinyl esters such as vinyl acetate, vinyl propionate and the like; acrylic and methacrylic esters, such as methyl acrylate, ethyl acrylate and the like; olefins such as ethylene, propylene and the like; maleic anhydride; acrylonitrile; styrene; vinylidene chloride; and other monomers copolymerizable with vinyl chloride. These comonomers may be used either singly or in combination of two or more.

The total amount of the oil-soluble polymerization initiators (A) and (B) to be added into the polymerization vessel is normally from 0.033 to 0.7% by weight, preferably from 0,033 to 0.4% by weight, based on the amount of monomer charged into the vessel.

In the present invention, the suspension polymerization can be carried out according to methods which are known .per se, except for using the polymerization initiators (A) and (B) in the predetermined amounts as above described. For instance, the methods of charging the aqueous medium, the monomer such as vinyl chloride or the like, the suspending agent, etc. into the polymerization vessel, the amounts of the materials to be charged, and the like may be equivalent to those conventionally adopted.

General procedures of polymerization according to the present invention will now be exemplified below.

First, water and a suspending agent are charged into a polymerization vessel. Next, the vessel is evacuated to lower the internal pressure to a value of 0.1 to 100 mmHg, and then a monomer is charged into the vessel. Upon the charging of the monomer, the pressure inside the polymerization vessel normally takes a value of from 0.5 to 30 kgf/cm$^2$.G. The polymerization initiators (A) and (B) as described above are placed into the vessel before and/or after the monomer is charged. Thereafter, polymerization is conducted at a reaction temperature of normally from 40° to 65° C. In connection with the use of the polymerization initiators (A) and (B), in the present invention, it is preferable to carry out the polymerization at 45° to 65° C. During polymerization, if necessary, one or more of water, suspending agent and the initiators (A) and (B) may be added. The polymerization is judged to be completed when the pressure inside the polymerization vessel has fallen to a value of 0 to 7 kgf/cm$^2$.G or when the cooling water let flow into and out of the jacket arranged around the vessel has come to take approximately equal inlet and outlet temperatures (namely, when the generation of heat due to polymerization reaction has subsided). The total amounts of water and the suspending agent employed for the polymerization are normally from 80 to 500 parts by weight and from 0.01 to 30 parts by weight, respectively, per 100 parts by weight of the monomer.

The suspending agent to be used in the process of the present invention may be any of those conventionally used, for example, water-soluble polymers such as water-soluble cellulose ethers such as methyl cellulose, hydroxyethyl cellulose, hydroxypropyl cellulose, hydroxypropyl methyl cellulose and the like; partially saponified polyvinyl alcohols; acrylic acid polymers; gelatin, and so forth. These may be used either singly or in combination of two or more. Together with the suspending agent as above, may be used nonionic emulsifying agents such as sorbitan monolaurate, sorbitan trioleate, glycerol tristearate, ethylene oxide/propylene oxide block copolymers, etc., anionic emulsifying agents such as polyoxyethylene sorbitan monolaurate, polyoxyethylene glycerol oleate, sodium laurate, etc., and the like, either singly or in combination of two or more.

Furthermore, if necessary, polymerization regulating agents, chain transfer agents, pH adjusters, gelation improving agents, antistatic agents, scale preventive agents and the like which are conventionally used suitably in polymerization of vinyl chloride or the like may also be added to the polymerization system in the process of the present invention.

EXAMPLES

The present invention will now be described below with reference to an example thereof and comparative examples.

Example 1

A 2-m³, jacketed stainless-steel polymerization vessel was charged with 856 kg of deionized water, and then with 206 g of a partially saponified polyvinyl alcohol and 137 g of a-cellulose ether in the state of aqueous solution. Then, the polymerization vessel was evacuated to reduce the internal pressure to 50 mmHg, and 685 kg of vinyl chloride monomer was charged into the vessel. Further, while the mixture in the polymerization vessel was stirred, 190 g of di-2-ethylhexyl peroxydicarbonate (t½(10hr): 43.5° C.) and 190 g of t-butyl peroxyneodecanoate (t½(10hr): 46.5° C.) as oil-soluble polymerization initiators (A) and 75 g of isobutyryl peroxide (t½(10hr): 32.5° C.) as oil-soluble polymerization initiator (B) were pumped into the vessel. Subsequently, hot water at 60° C. was let flow through the jacket arranged around the polymerization vessel, to raise the temperature inside the vessel. After the inside temperature was raised to 57° C., cold water was let flow through the jacket to maintain the inside temperature at 57° C. while polymerization was continued. When the pressure inside the vessel reached 6.0 kg/cm². G, the polymerization was stopped and the unreacted monomer was recovered out of the vessel. The vinyl chloride polymer formed was drawn out of the vessel in a slurry state, and was dehydrated and dried.

In the polymerization process as above, the period of time from the moment the passage of hot water through the jacket was started to the moment the inside temperature reached 57° C. (temperature-raising time) and the period of time from the moment the passage of cold water through the jacket was started to the moment of stopping the polymerization (reaction time) were measured. The results are given in Table 1.

Besides, the vinyl chloride polymer obtained was subjected to measurements of bulk specific gravity, particle size distribution, plasticizer absorption and the number of fish eyes appearing upon formation of the polymer into a sheet, according to the methods described below. The results are given in Table 1.

(1) Bulk specific gravity
Measured according to JIS K 6721.
(2) Particle size distribution
Using 60-, 100- and 200-mesh sieves according to JIS Z 8801, the polymer particles were sifted, and the amount of polymer particles (% by weight) having passed through each sieve was measured.
(3) Plasticizer absorption
Glass fibers were packed in the bottom of an aluminum alloy vessel 25 mm in inside diameter and 85 mm in depth, and 10 g of the vinyl chloride polymer sample was placed into the vessel. Then, 15 cc of dioctyl phthalate (hereinafter referred to as "DOP") was added, and left to stand for 30 minutes so that the DOP permeated the polymer sufficiently. Excess portion of the DOP was centrifugally removed under an acceleration of 1500 G, and the amount of DOP absorbed in 10 g of the polymer was measured. The measured absorption amount was converted to absorption amount per 100 g of the polymer.
(4) Fish eyes
A mixture prepared by mixing 100 parts by weight of the vinyl chloride polymer sample, 1 part by weight of tribasic lead sulfate, 1.5 parts by weight of lead stearate, 0.2 part by weight of titanium oxide, 0.1 part by weight of carbon black and 50 parts by weight of DOP, was kneaded by rolls at 145° C. for 5 minutes, and formed into a sheet 0.2 mm in thickness. For the sheet thus obtained, the number of fish eyes per 100 cm² area was counted.

Comparative Example 1

A vinyl chloride polymer was obtained by carrying out polymerization in the same manner as in Example 1, except that a combination of 190 g of di-2-ethylhexyl peroxydicarbonate, 190 g of t-butyl peroxyneodecanoate and 75 g of t-hexylperoxyneodecanoate was used as polymerization initiator, in place of the combination of 190 g of di-2-ethylhexyl peroxydicarbonate, 190 g of t-butyl peroxyneodecanoate and 75 g of isobutyryl peroxide.

In the polymerization thus conducted, the temperature-raising time and reaction time were as given in Table 1.

The polymer obtained was measured for bulk specific gravity, particle size distribution, plasticizer absorption and the number of fish eyes appearing upon formation of the polymer into a sheet, according to the same methods as in Example 1. The results are given in Table 1.

Comparative Example 2

A 2-m³, jacketed stainless-steel polymerization vessel was charged with a solution of 206 g of a partially saponified polyvinyl alcohol and 137 g of a cellulose ether in 856 kg of deionized water. The vessel was charged also with a solution of 190 g of di-2-ethylhexyl peroxydicarbonate (t½(10hr): 43.5° C.), 190 g of t-butyl peroxyneodecanoate (t½(10hr): 46.5° C.) and 75 g of t-hexylperoxyneodecanoate in 685 kg of vinyl chloride monomer. The solutions were charged into the vessel while being heated at 57° C.

Subsequently, polymerization was conducted with the temperature inside the vessel maintained at 57° C. by circulating cold water through the jacket. When the pressure inside the vessel reached 6.0 kg/cm².G, the polymerization was stopped and the unreacted monomer was recovered out of the vessel. The vinyl chloride polymer formed was drawn out of the vessel in a slurry state, and was dehydrated and dried.

In the polymerization as above, the reaction time was as given in Table 1.

The polymer obtained was measured for bulk specific gravity, particle size distribution, plasticizer absorption and the number of fish eyes appearing upon formation of the polymer into a sheet, according to the same methods as in Example 1. The results are given in Table 1.

TABLE 1

|  | Example 1 | Comparative Example 1 | Comparative Example 2 |
|---|---|---|---|
| Temperature raising time | 18 min 30 sec | 23 min 20 sec | — |
| Reaction time | 4 hr 43 min | 4 hr 59 min | 4 hr 45 min |
| Bulk specific gravity (g/cc) | 0.524 | 0.522 | 0.502 |
| Plasticizer absorption (g) | 23.6 | 24.0 | 21.3 |
| Particle size distribution (pass, wt. %) | | | |
| 60 mesh | 100 | 100 | 95.1 |
| 100 mesh | 41.5 | 45.3 | 17.3 |
| 200 mesh | 0.1 | 0.0 | 0.0 |
| Fish eyes | 2 | 12 | 250 |

We claim:

1. A process for producing a vinyl chloride-based polymer, which comprises suspension polymerizing vinyl chloride monomer or a vinyl chloride-containing monomeric mixture in an aqueous medium in the presence of an oil-soluble polymerization initiator,
wherein said oil-soluble polymerization initiator consists essentially of
(A) at least one compound having a 10-hour half-life temperature, at a concentration of 0.1 mol/l in benzene, of not lower than 35° C. selected from the group consisting of peroxycarbonate compounds and peroxyester compounds, and
(B) isobutyryl peroxide,
said oil-soluble initiator (B) being present in an amount ranging form 0.01 to 0.04% by weight based on the amount of said monomer or monomeric mixture and ranging from 10 to 30% by weight based on the total amount of said oil-soluble initiators (A) and (B).

2. The process of claim 1, wherein the component (A) comprises at least one compound having a 10-hour half-life temperature, at a concentration of 0.1 mol/l in benzene, of from 40° to 60° C.

3. The process of claim 1, wherein the component (B) comprises at least one compound having a 10-hour half-life temperature, at a concentration of 0.1 mol/l in benzene, of from 25° to 34° C.

4. The process of claim 1, wherein said vinyl chloride-containing monomeric mixture comprises a mixture of vinyl chloride with at least one compound selected from the group consisting of vinyl esters, acrylic esters, methacrylic esters, olefins, maleic anhydride, acrylonitrile, styrene, and vinylidene chloride.

5. The process of claim 1, wherein the components (A) and (B) are present in a total amount of from 0.033 to 0.7% by weight based on the amount of said monomer or monomeric mixture.

6. The process of claim 1, wherein the polymerization is conducted at a temperature of from 45° to 65° C.

* * * * *